United States Patent [19]

Daharsh et al.

[11] Patent Number: 5,104,065
[45] Date of Patent: Apr. 14, 1992

[54] READLY CONVERTIBLE AIRCRAFT PASSENGER SEATS

[75] Inventors: Donald R. Daharsh, Renton; Wallace A. Peltola, Redmond; James B. Sterling, Renton, all of Wash.

[73] Assignee: The Boeing Company, Seattle, Wash.

[21] Appl. No.: 482,197

[22] Filed: Feb. 20, 1990

[51] Int. Cl.⁵ ............................................. B64D 11/06
[52] U.S. Cl. ............................ 244/118.6; 244/122 R; 297/232; 297/257; 296/65.1
[58] Field of Search ..................... 244/118.6, 122 R; 297/118, 130, 232, 257; 296/65.1

[56] References Cited

U.S. PATENT DOCUMENTS

| | | | |
|---|---|---|---|
| 2,758,872 | 8/1956 | Solomon et al. | 296/65.1 |
| 3,637,253 | 1/1972 | Maule et al. | 296/65.1 |
| 3,893,729 | 7/1975 | Sherman et al. | 297/232 |
| 4,533,175 | 8/1985 | Brennan | 297/232 |
| 4,881,702 | 11/1989 | Slettebak | 244/118.6 |

OTHER PUBLICATIONS

"Boeing Model 747 Technical Reference data", The Boeing Commercial Airplane Co., 747 Division, Sep. 1978, pp. 4–7.

*Primary Examiner*—Joseph F. Peters, Jr.
*Assistant Examiner*—Christopher P. Ellis
*Attorney, Agent, or Firm*—Delbert J. Barnard

[57] ABSTRACT

Two seat assemblies are provided side-by-side, in a row, on opposite sides of an aisle (16). A first seat assembly comprises window, middle and aisle seats (RW, RM, RA) which are movable between a first narrow seat spacing and a second wider seat spacing (FIGS. 7 and 8). The second seat assembly is convertible between three seats (LA, LM, LW) with the first spacing and two seats with the larger spacing (FIGS. 7 and 8). Each seat assembly includes a tube-in-tube support frame for the seats which allows the conversion and seat size to be accomplished by a simple sliding of movement of the aisle and middle seat frames towards and away from the window seat frame which is fixed in position (FIGS. 9 and 10).

23 Claims, 6 Drawing Sheets

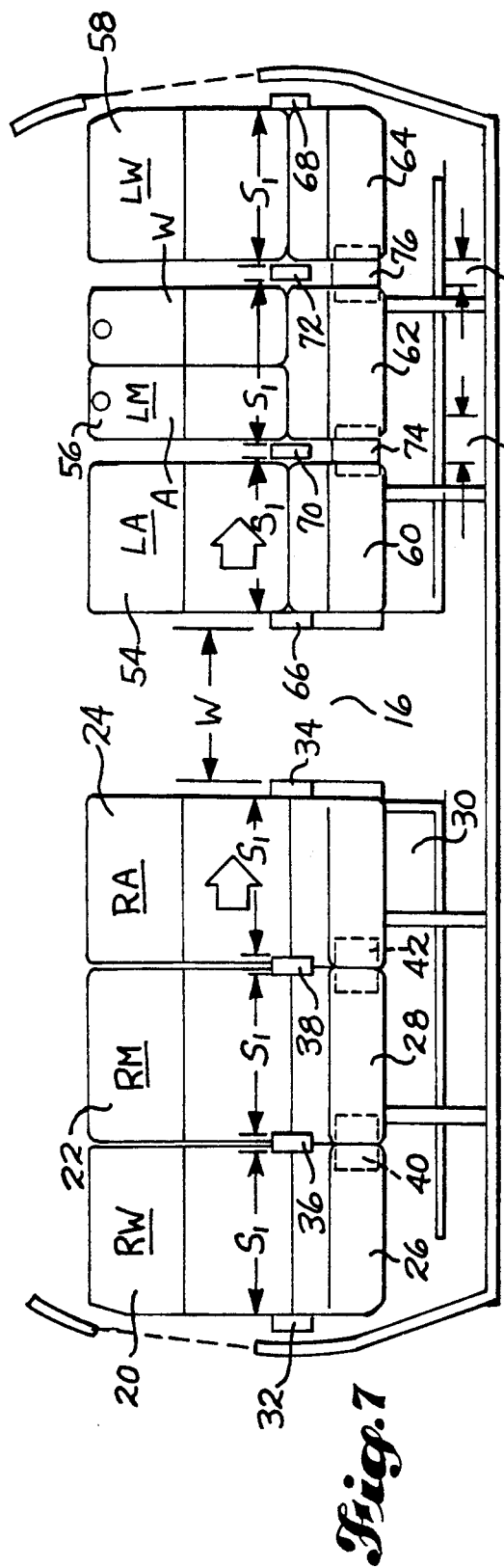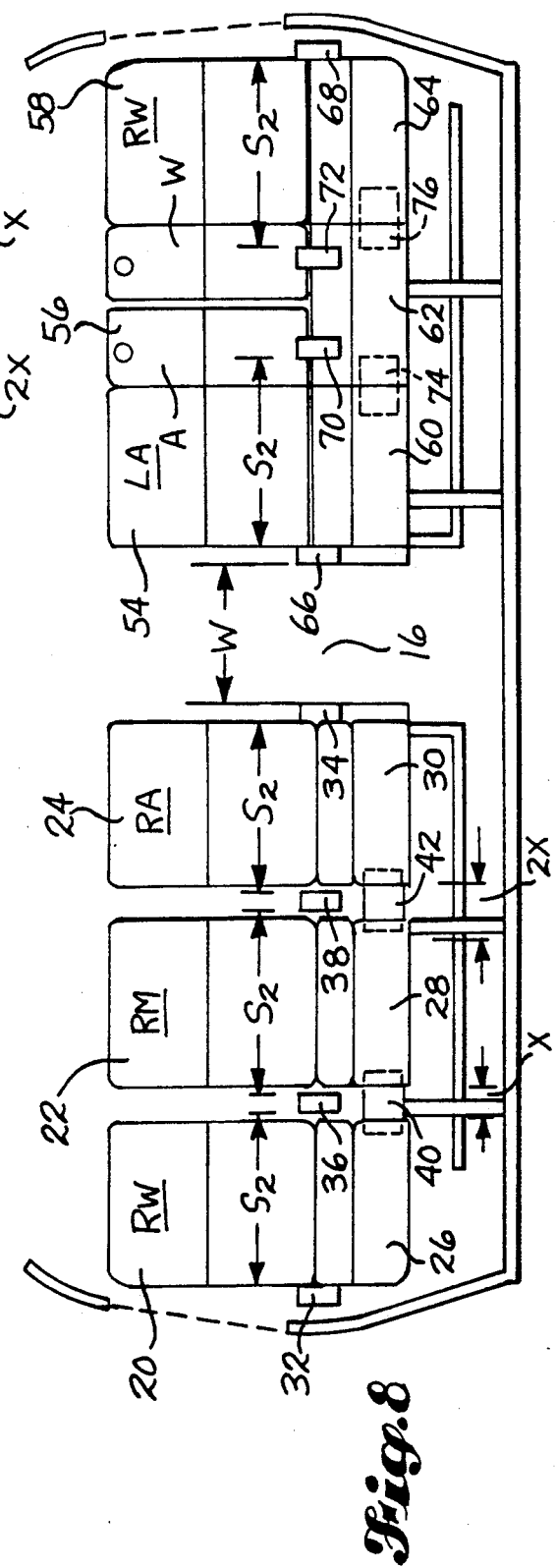

5,104,065

READILY CONVERTIBLE AIRCRAFT PASSENGER SEATS

TECHNICAL FIELD

This invention relates to passenger seats on an aircraft which are convertible from one size seat to another. More particularly, it relates to the provision of seat assemblies which are constructed to be extendible and retractable laterally for changing the number and size of the individual seats in a row.

BACKGROUND ART

There is a need for commercial airlines to be able to convert passenger seating arrangements from six seats to five seats in a row and back. There is a need to permit this change in configuration of the seats to be accomplished quickly and without removing the aircraft from service. Presently, the conversion from a six seat configuration to a five seat configuration, or vice versa, is accomplished by physically removing the seats of the existing configuration and replacing them with new seats to provide the other configuration. Such change requires considerable time and is usually performed when the aircraft is out of service.

U.S. Pat. No. 4,881,702, granted Nov. 21, 1989 to Richard J. Slettebak, and also owned by The Boeing Company, addresses the same problem as the present invention but for a different size aircraft, and provides a different type of solution. This patent also discusses the prior art and identifies some other prior art patents relating to aircraft seat constructions. U.S. Pat. No. 4,881,702, and the other patents identified in it, should be consulted for the purpose of putting the present invention into proper perspective relative to the prior art.

An object of the invention is to provide a seat construction which allows a quick and easy conversion of six seats in a row to five seats of a larger seat spacing, and vice versa. Another object of the invention is to provide a seat construction which will permit a quick and easy conversion of the seats, without the use of removable or plug-in parts.

DISCLOSURE OF THE INVENTION

One aspect of the invention is to provide an aircraft passenger seat assembly of side-by-side window, middle and aisle seats which are convertible between a first seat spacing and a second wider seat spacing. Such seat assembly is basically characterized by support base, a seat cushion support frame on the support base, and three side-by-side seat cushions, one for each of the window, middle and aisle seats. The seat cushion support frame includes a fixed window seat frame portion, a movable middle seat frame portion, and a movable aisle seat frame portion. Each seat cushion includes a back portion and a seat portion. Each seat cushion is supported on and by its frame portion. The middle seat frame portion and its seat cushion and the aisle seat frame portion and its seat cushion are movable towards and away from the window seat frame portion and its seat cushion. The aisle seat frame portion and its seat cushion movable towards and away from the middle seat frame portion and its seat cushion. Owing to this construction, the middle seat can be moved against the window seat and the aisle seat can be moved against the middle seat, to provide the first spacing of the three seats. And, the middle and aisle seats can be moved away from the window seat, and the aisle seat can be moved away from the middle seat, to provide the second wider spacing of the three seats.

A second aspect of the invention is to provide an aircraft passenger seat assembly which is convertible between three side-by-side seats of a first seat spacing and two side-by-side seats of a second wider seat spacing. This passenger seat assembly is basically characterized by a support base, a seat cushion support frame on the support base, and three side-by-side seat cushions, one for each of the seat frame portions. The seat cushion support frame includes a fixed window seat frame portion, a movable middle seat frame portion and a movable aisle seat frame portion. Each seat cushion is supported on and by its seat frame portion and each seat cushion has a back portion and a seat portion. The middle seat frame portion and its seat cushion are the aisle seat frame portion and its seat cushion are movable towards and away from the window seat frame portion and its seat cushion. The aisle seat frame portion and its seat cushion are movable towards and away from the middle seat frame portion and its seat cushions. Owing to this construction, the middle seat frame portion and its seat cushion can be moved away from the window seat frame portion and its seat cushion and the aisle seat frame portion and its seat cushion can be moved away from the middle seat frame portion and its seat cushion, to provide window, middle and aisle seats having the first seat spacing. And, the middle seat frame portion and its seat cushion can be moved towards the window seat frame portion and its seat cushion, and the aisle seat frame portion and its seat cushion can be moved towards the middle seat frame portion and its seat cushion, to define on the three seat cushions two passenger seats having a second wider spacing.

According to an aspect of the invention, the two types of seat assemblies which have been described are combined together in a single row in an aircraft passenger compartment. Together, the two seat assemblies permit a quick and easy conversion between six seats in the row with a first spacing and five seats in the row with a second wider spacing. In each configuration the row includes a service aisle of a usual width.

According to an aspect of the invention, the window seat of each seat assembly includes a window side arm rest which is fixed in position and the aisle seats each include an aisle side arm rest which is fixed in position with respect to each aisle seat. Each seat assembly includes an armrest frame secured to the window seat frame portion. An armrest is supported on and by this frame for sideways movement between two positions. This armrest is positioned between the window and middle seats. The first seat assembly has a second armrest frame which is connected to the aisle seat frame portion and moves with it. An armrest is supported on and by this armrest frame for sideways movement between two positions. This armrest is located between the middle and aisle seats. The second seat assembly includes an armrest frame that is connected to the window seat frame portion. An armrest is supported on and by this frame for sideways movement between two positions. This armrest is on the aisle side of the window seat. A second armrest frame is connected to the middle seat frame portion. An armrest is supported on and by this armrest frame for sideways movement between two positions. This armrest is on the window side of the aisle seat. According to an aspect of the invention, a filler member is located between the seat portions of adjacent seat cushions, to eliminate a gap between such seat portions when the seats are moved relatively apart.

Further objects, features and advantages of the invention are hereinafter described as a part of the description of the best mode of carrying out the invention. The best mode and the claims both constitute a further description of the invention.

BRIEF DESCRIPTION OF THE DRAWINGS

In the drawings, like reference characters are used to designate like parts throughout the several views, and:

FIG. 7 is a front elevation diagram of the seat cushions, filler elements between the seat portions of the seat cushions, and the armrests, showing the relative spacing these elements when the two seat assemblies are adjusted to provide a six across tourist class seat configuration;

FIG. 8 is a view like FIG. 7, but showing the change in position of the elements when the two seat assemblies are adjusted to provide five seats across with a business class seat spacing;

BEST MODE FOR CARRYING OUT THE INVENTION

Figure 1:
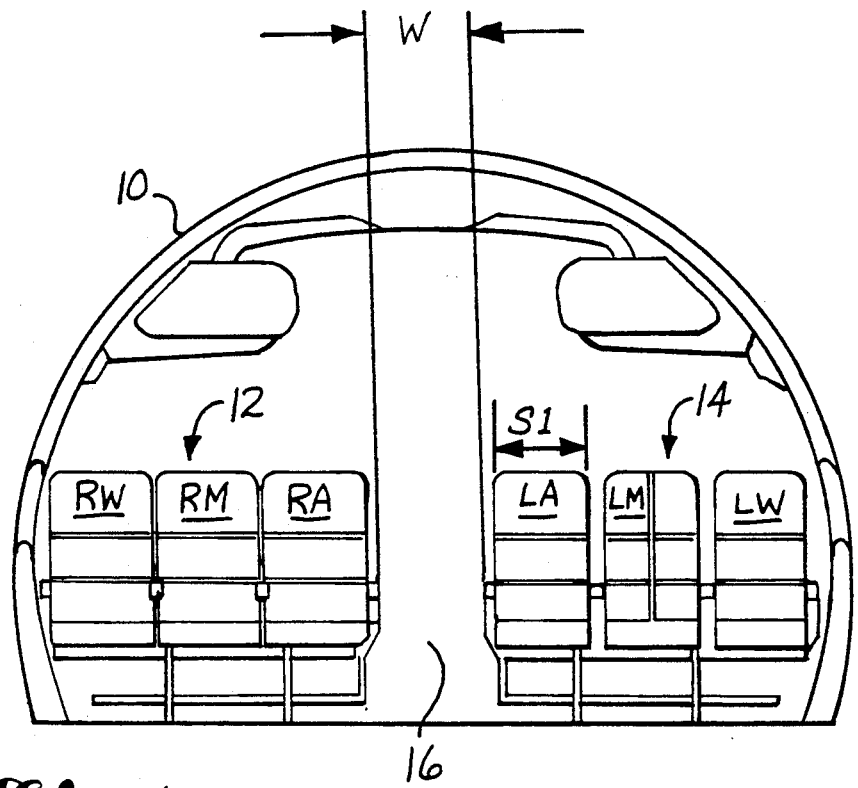
FIG. 1 is a sectional view through the passenger compartment of an aircraft presenting a front elevational view of a row of six seats, three seats on each side of a center aisle.
Figure 2:
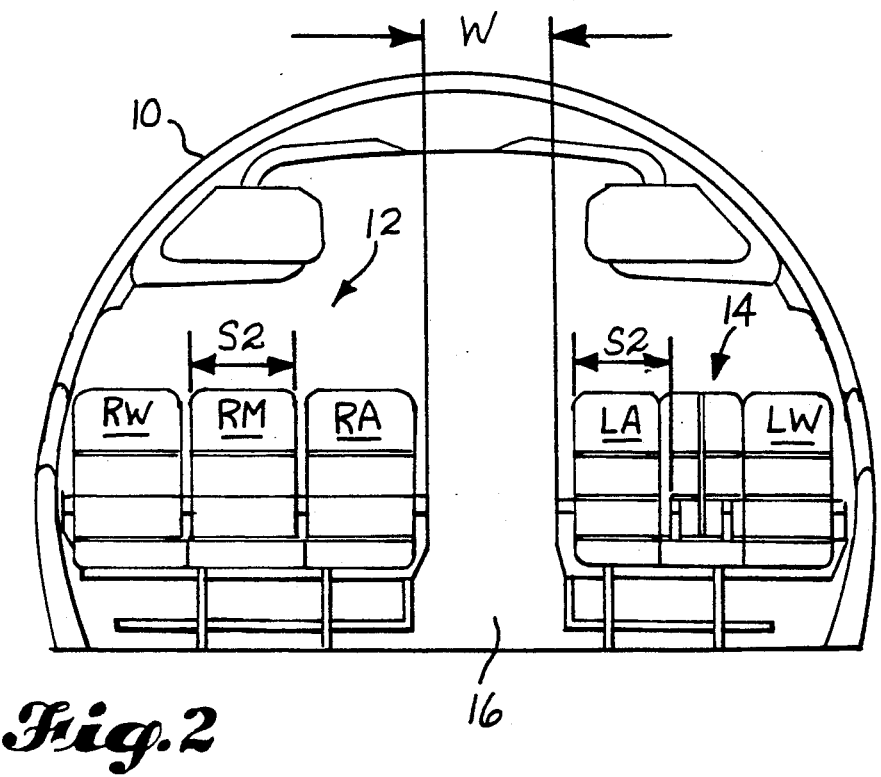
FIG. 2 is a view like FIG. 1, but showing the same seat structure after it has been converted to a row of five business class seats, three seats on one side of the aisle and two seats on the opposite side of the aisle.

Referring to FIGS. 1 and 2, a passenger compartment portion of an aircraft body 10 is shown in cross section. In accordance with the present invention, an extendible contractible first seat assembly 12 is provided on one side of an aisle (e.g. the right side) and an extendible-retractable second seat assembly 14 is provided on the second side of the aisle (e.g. the left side). Together these seat assemblies 12, 14 provide a row of seats which includes a center aisle 16. In FIG. 1, the right side seat assembly 12 is retracted and the left side seat assembly 14 is extended. This configuration of the two seat assemblies 12, 14 provides six seats in the row, three seats on each side of the center aisle 16. In this configuration the seat width, measured between armrests, is substantially the same for each seat. FIG. 2 shows the right side seat assembly 12 expanded, the left side seat assembly 14 contracted, and the armrests repositioned, so as to define five wider seats in the row. The width of aisle 16 is substantially the same for both configurations of the seats, but in the six seat configuration the aisle 16 is substantially centered whereas in the five seat configuration the aisle 16 is offset from center towards the left side of the aircraft.

Figures 3, 4:
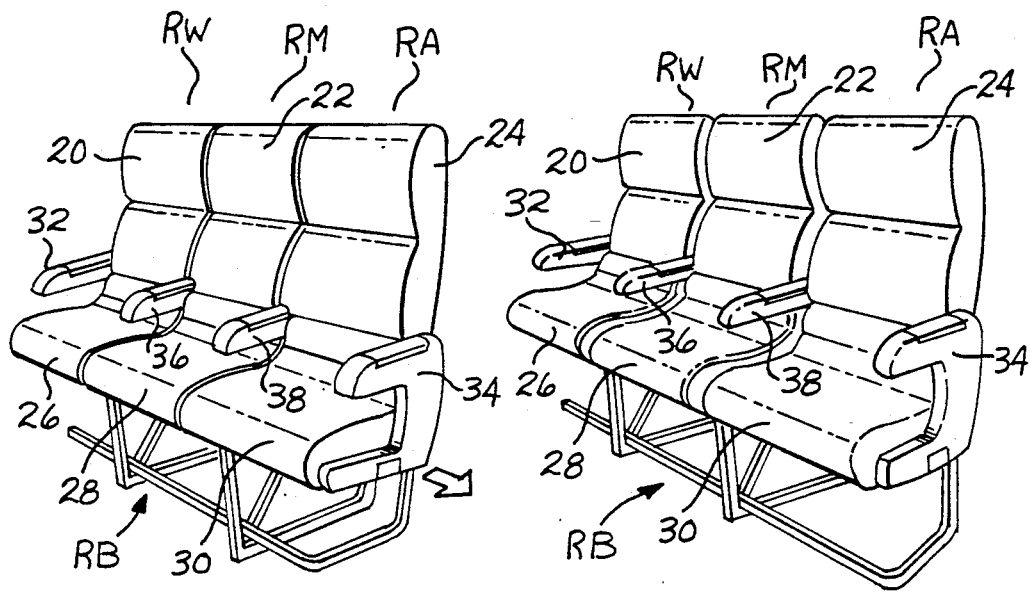
FIG. 3 is a pictorial view of the right side seat assembly, shown in the tourist seat configuration of FIG. 1.
FIG. 4 is a view like FIG. 3 but showing the seat assembly extended in width to provide business class size seats.

Referring to FIGS. 3 and 4, the right seat assembly comprises a window seat RW, a middle seat RM and an aisle seat RA. The seat assembly also includes a support base RB which is secured to the floor of the passenger compartment. A seat cushion support frame is supported on and by the base RB. The seat cushions for the seats RW, RM, RA are supported on and by the seat cushion support frame. The seat cushions comprise upper back supporting portions 20, 22, 24 and lower seat portions 26, 28, 30. The window seat RW has a window armrest 32 which is fixed in position relative to the window seat RW. Window seat RW is also fixed in position. Aisle seat RA includes an aisle armrest which is fixed in position relative to the aisle seat RA and moves outwardly or inwardly with the aisle seat RA when it is moved. The armrest 36 that is between the window seat RW and the middle seat RM may be referred to as the window/middle armrest. The armrest 38 between the middle seat RM and the aisle seat RA may be referred to as the middle/aisle armrest.

As shown by FIGS. 3, 4, 7 and 8, when the right side seats RW, RM, RA are moved relatively together, the window/middle armrest 36 is substantially where the seats RW and RM substantially meet. The middle/aisle armrest 38 is substantially where the seats RM and RA meet. The seat width S1, measured between the armrests, is substantially equal for all three seats. In a typical aircraft, the distance S1, may be about seventeen inches, for example. The aisle width W may be about twenty inches.

Referring to FIGS. 7 and 8, the conversion of the seat spacing from the narrower spacing S1 to the wider spacing S2 is accomplished in the following manner. The aisle seat RA is moved towards the aisle a distance 2X and the seat RM is moved toward the aisle a distance X. In a typical example, X may equal three inches. This provides a new seat width or spacing S2 of about nineteen inches. The armrest 36 and 38 are also moved towards the aisle as shown in FIG. 8.

Figure 12:
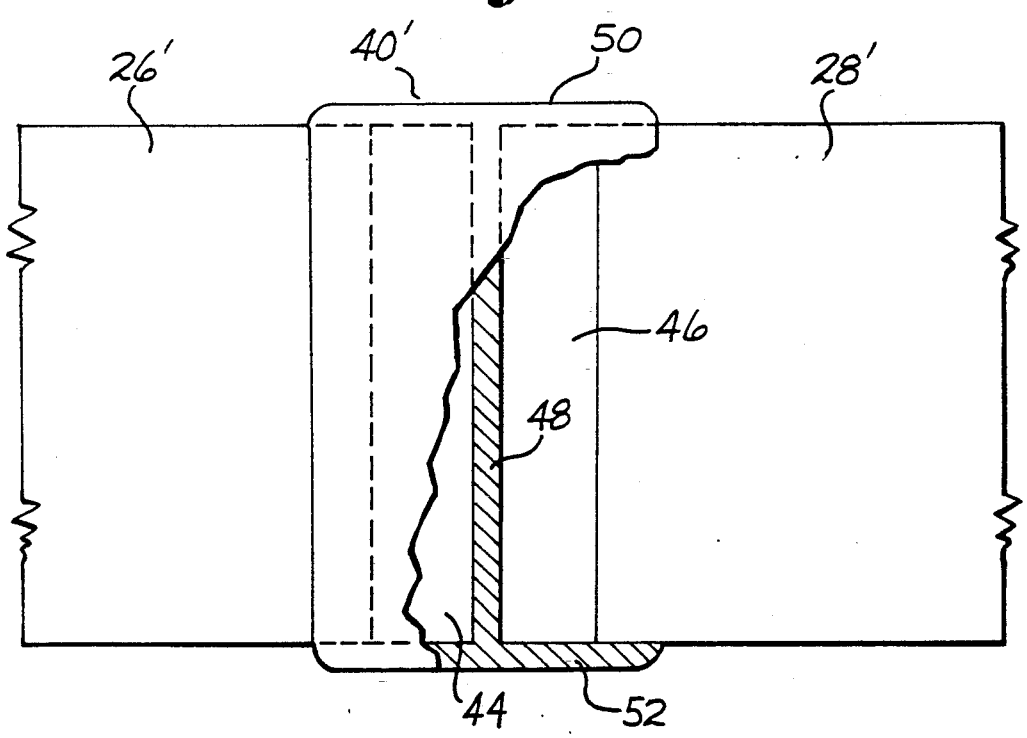
FIG. 12 is a view like FIG. 11 showing a modified construction of the filler member.

According to an aspect of the invention, a filler member 40 is positioned between seat cushion portions 26 and 28. Another filler member 42 is positioned between the seat cushion members 28 and 30. The opposite side portions of the filler members 40, 42 may be received within sockets formed in opposing side portions of the seat cushions. FIG. 12 shows an alternative construction of the filler member. By way of example, a filler member 40' between seat cushions 26' and 28' is illustrated. The filler member 40' is constructed to have a substantially H-shaped cross sectional shape, providing a pair of channels 44, 46 on the opposite side of a web 48. Side portions of the seat cushions 26', 28' move into and out from the channels 44, 48 when the seats RW, RM are moved together and apart. Upper and lower flanges 50, 52 bridge between the cushions 26', 28'.

Figures 5, 6:
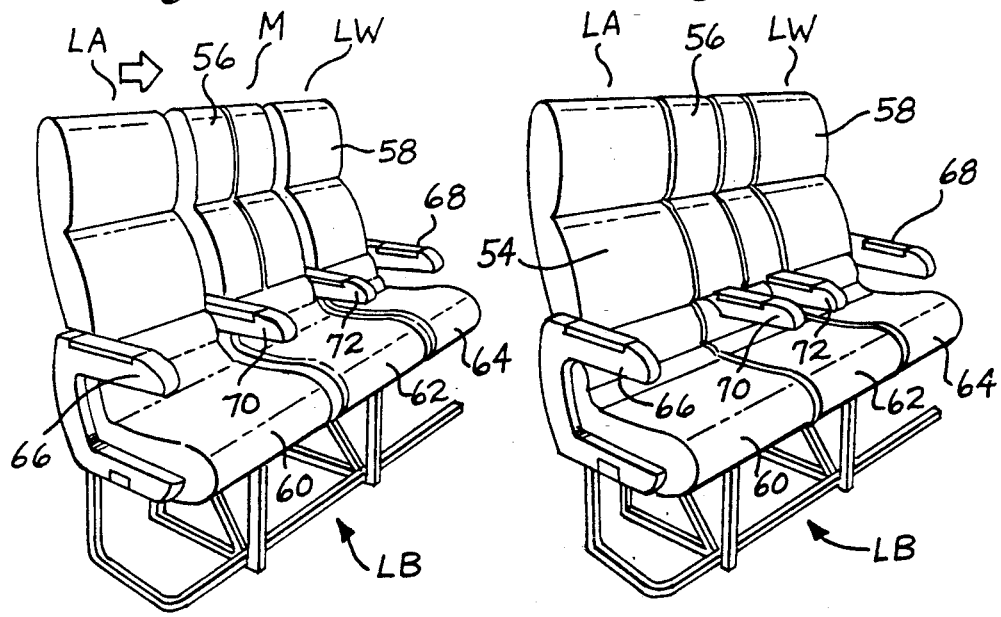
FIG. 5 is a pictorial view of the left side seat assembly, extended to provide three side-by-side seats of tourist class spacing.
FIG. 6 is a view like FIG. 5, but showing the seat assembly contracted, and the inside two arm rests moved, to reconfigure the seat assembly into two seats having a business class spacing.
Figure 11:
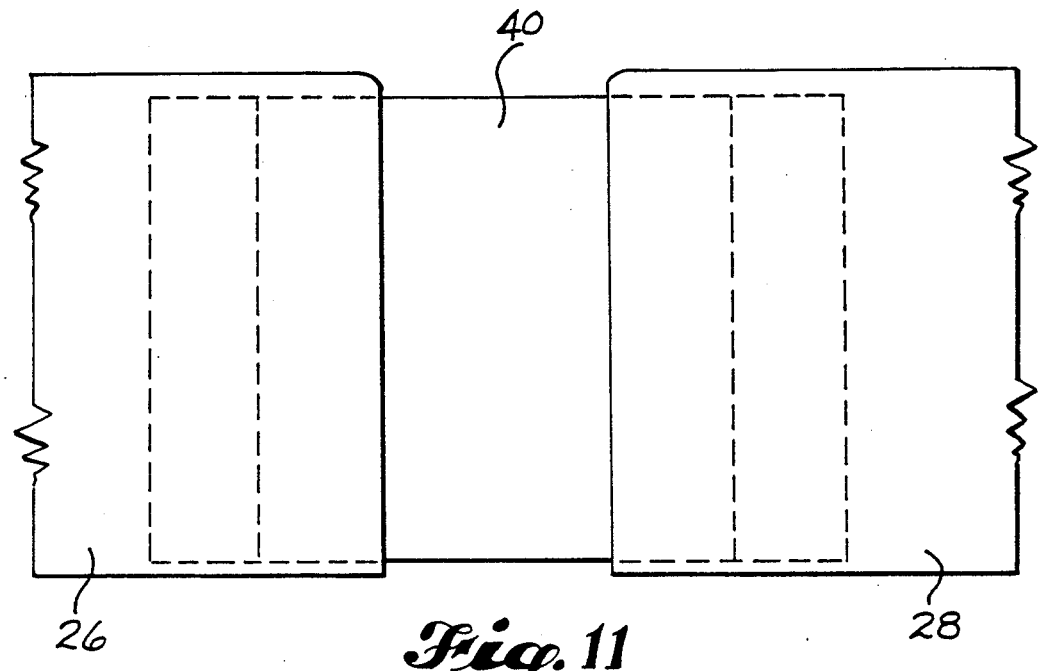
FIG. 11 is an enlarged scale fragmentary view at a region between adjacent seat portions of the seat of the seat cushions, showing a first construction of the filler member.

Referring to FIGS. 5 and 6, the left side seat assembly includes a support base LB. A seat cushion support frame is supported on and by the support base LB. This seat assembly comprises three side-by-side seat cushions, which are supported on and by the seat cushion support frame. However, in one configuration of the seat assembly, three seats are defined. In the second configuration only two seats are defined. The three seats are designated LA, LM and LW. The two seat configuration only includes seats A and LW. Each seat cushion includes an upper backrest portion 54, 56, 58 and a lower seat portion 60, 62, 64. An aisle armrest 66 is fixed in position on the aisle side of seat LA. A window armrest 68 is fixed in position on the window side of seat LW. Armrest 70, positioned between seat cushion portions 54, 56, and armrest 72 between seat cushion portions 56 and 58 are movable in position. Armrest 70 may be referred to as the aisle/middle armrest and armrest 72 may be referred to as the middle/window armrest. A filler member 74 may be provided between seat cushion portion 60 and seat cushion portion 62. A filler member 76 may be provided between seat cushion portion 62 and seat cushion portion 64. These filler members may be as shown in FIGS. 11 and 12.

FIG. 8 shows the seat cushions 54, 60 and 56, 62 and 58, 64 moved relatively together. FIG. 7 shows them spaced apart. Seat cushions 56, 62 are moved towards the aisle and away from the seat cushions 58, 64 a distance X. Seat cushions 54, 60 are moved towards the aisle away from their original position a distance 2X. When the seat cushions 54, 60 and 56, 62 and 58, 68 are spaced apart, as shown by FIG. 7, the armrests 70 and 72 are positioned so that three seats LA, LM, LW are formed and the seat width or spacing S1 is substantially equal for all three seats and is substantially equal to the width or between armrest spacing of the right side seats RW, RM, RA.

As shown by FIG. 8, when the right side seats are extended, to increase the seat width, the left side seats are contracted. Seat cushions 56, 62 are moved towards and substantially against seat cushions 58, 64 and seat cushions 54, 60 are moved towards and substantially against seat cushions 56, 62. The intermediate armrests 70, 72 are moved together, so as to increase the spacing between armrest 68 and 70 and between armrest 68 and 72, while reducing the spacing between armrest 70, 72 such that the middle seat LM ceases to exist. In this seat configuration, two seats are defined which have the wider spacing S2. The filler members 74, 76 may be like filler member 40', described above.

Seat cushion 56 is split down its middle into parts A and W. In the three seat configuration, part A and its support frame are locked to cushion part 54 and its support frame and part W and its support frame are locked to cushion part 58 and its support frame. In the two sea configuration, parts A and W and their support frames are locked together.

Figure 9:
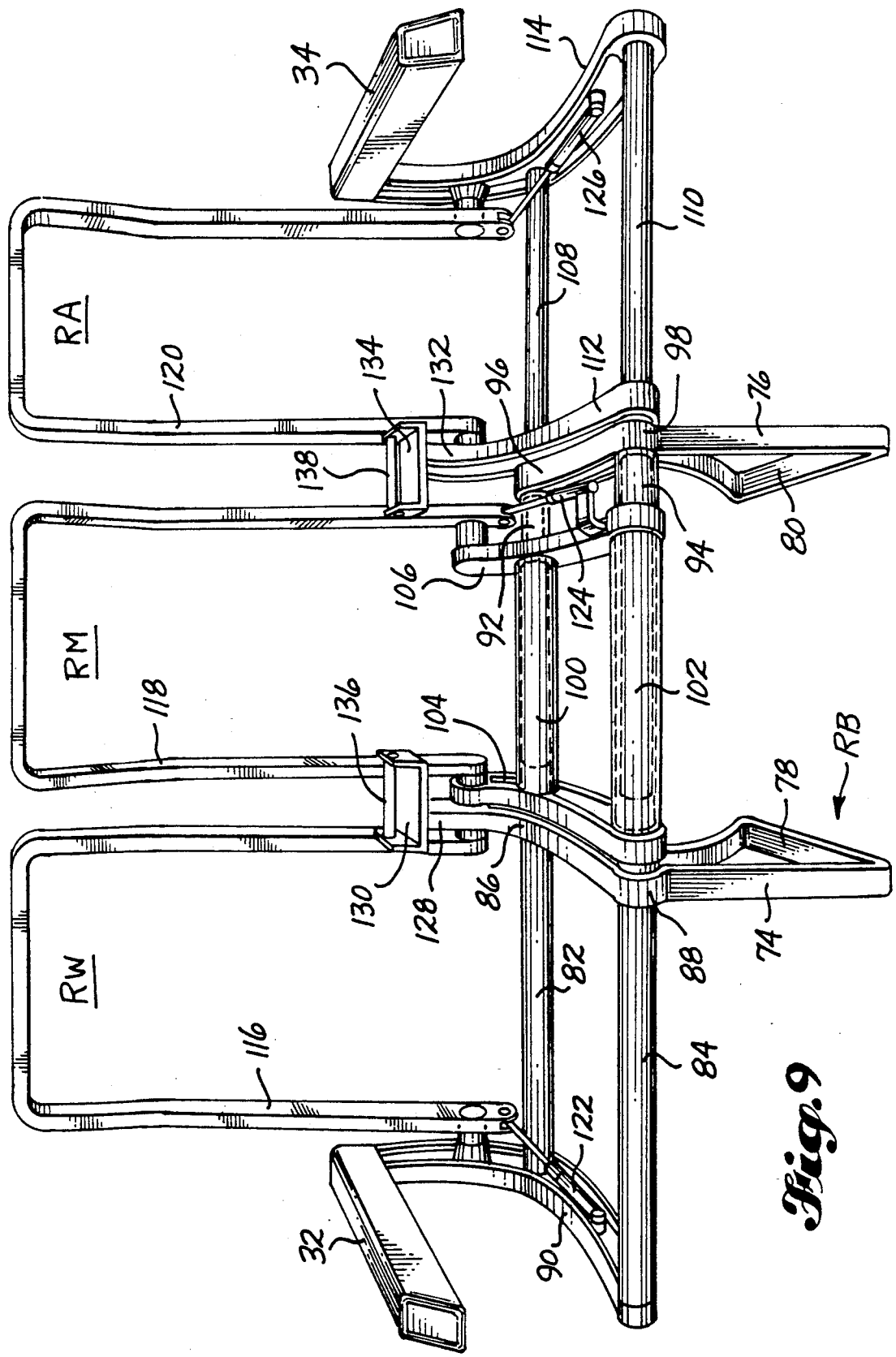
FIG. 9 is a pictorial view of the right side seat assembly, with the seat cushions are moved, so as to expose a preferred embodiment of the seat assembly frame.

FIG. 9 shows the frame portion of the right seat assembly. The base structure RB may comprise a pair of laterally spaded apart members 74c, 76c, each having a lower portion 78, 80 which is secured to the floor of the passenger compartment. Frame members 74, 76 are fixed in position and these do not move when the seats are moved. The seat cushion frame comprises a pair of parallel tubular members 82, 84. Intermediate portions of these two members 82, 84 are secured to upper portions of frame member 74, at locations 86, 88. Tube members 82, 84 extend to the right, as illustrated, in cantilever fashion, below the seat cushion for the window seat RW. This portion of the members 82, 84 constitute a part of the fixed window seat frame portion. The window ends of tubes 82, 84 are secured to a support frame 90 for the window armrest 32. Tubes 82, 84 also include portions 92, 94 which span between the upper portions of frame members 74, 76. The aisle ends of tubular members 82, 84 are secured to frame member 76 at locations 96, 98. The middle seat frame portion includes a pair of tubes 100, 102. These tubes are shorter in length than the distance between frame members 74, 76. Tube 100 surrounds tube 82 and tube 102 surrounds tube 84. The window end of tube 100 is connected to a frame member 104 and the aisle end of tube 100 is connected to a frame member 106. The window end of tube 102 is also connected to frame member 104 and the aisle end of tube 102 is also connected to frame member 106. As shown by FIG. 9, tubes 100, 102 and frame members 104, 106 define a lower portion of the movable middle seat frame portion. This frame portion is movable laterally between the frame members 74c, 76, a distance X. By way of example, this distance may be about three inches.

The aisle seat frame portion includes tubes 108, 110. Tube 108 has a portion which extends between frame members 112, 114, and a portion which extends towards the window from frame member 112, into telescopic engagement with tube 82. In similar fashion, tube 110 has a portion which spans between frame members 112, 114. It also includes a projecting portion which projects from frame member 112 towards the window and is telescopically received within tube 84. This tube-in-tube construction allows the aisle seat RA to be moved in and out relative to frame member 76. It is movable towards the aisle a distance 2X which, in the example given, is about six inches.

Suitable lock mechanisms are provided for locking the middle seat frame portion in each of its two positions and for locking the aisle seat frame portion in each of its two positions. The constructional details of these lock mechanisms do not constitute a part of the invention and many different lock devices may be utilized. For that reason, a lock mechanism is not illustrated. However, by way of example, a lock mechanism of the type disclosed in U.S. Pat. No. 4,881,702 may be used.

The seat back frames 116, 118, 120 are pivotally mounted onto the frame members 90, 86, and 104, 106 and 112, 114, respectively. Seat back position control devices 122, 124, 126 are provided. These devices are of conventional construction and therefore are neither illustrated or described in detail.

Frame member 90 supports at its upper end the window armrest 32. Frame member 74 has an upwardly extending rear portion 198 which carries an armrest mount 130. Frame member 114 has an upper portion which mounts the aisle armrest 32. Frame member 112 has an upwardly extending rear portion 132 which carries an armrest mount c134. Armrest mount 130 is captured between seat cushion members 20, 22 and armrest mount 134 is captured between seat cushion members 22, 24. Armrest 36 is mounted onto a slide bar 136 for sideways movement on the mount 130. In similar fashion, armrest 38 is mounted onto a slide bar 138, for sideways movement relative to the mount 134. A detent-type lock may be provided for looking each armrest 36, 38 in each of its two end positions. When the three seats RW, RM, RA are together (FIGS. 3 and 7) armrest 36 is moved on rod 136 towards the aisle end of mount 130 and armrest 38 is moved on rod 138 towards the window end of mount 134. When the three seats RW, RM, RA are extended, mount 130 doesn't move but mount 134 moves with the aisle seat frame portion towards the aisle. Armrest 36 is moved on member 126 towards the aisle. Armrest 38 is moved on rod c138 towards the window. In this manner the armrest 36, 38 are adjusted in position to provide the new spacing S2 of the seats, RW, RM, RA.

Figure 10:
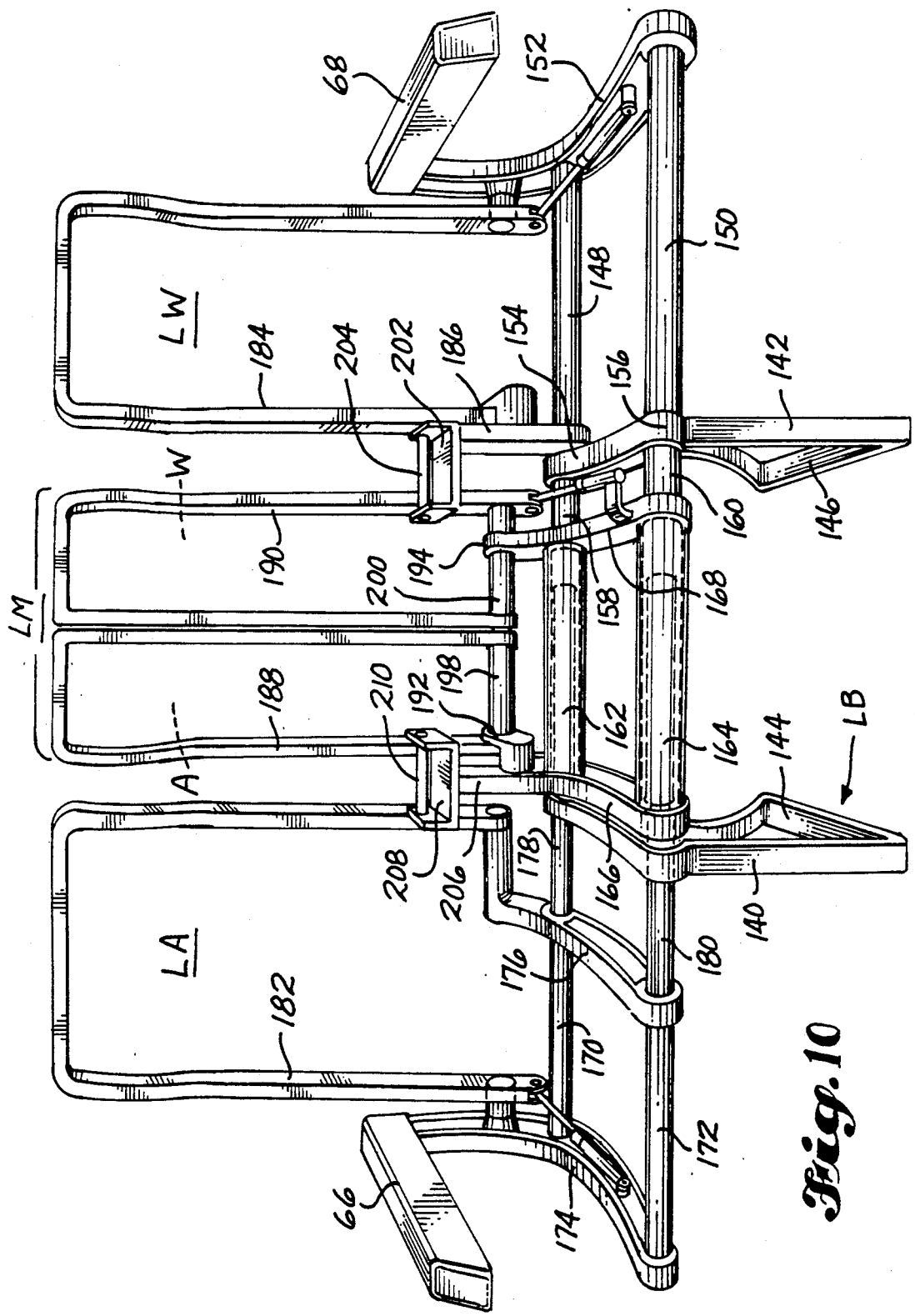
FIG. 10 is a view like FIG. 9, but of the left side seat assembly.

Referring to FIG. 10, base structure LB comprises a pair of frame members 140, 142 having lower portions 144, 146 which are connected to the floor of the passenger compartment. Frame members 140, 142 are fixed in position and do not move during adjustment of the seat assembly between its two sizes. The window seat frame portion includes a pair of parallel tubes 148, 150. The window ends of these tubes 148, 150 are connected to a frame member 152 which is the armrest frame for window armrest 68. A portion of tubes 148, 150 span between frame members 142 and 152. The tubes 148, 150 are connected to upper portions of frame 142 at locations 154, 156. Tubes 148, 150 also include portions 158, 160 which span between frames 140, 142. The middle seat frame portion includes a pair of tubes 162, 164 which at their ends are connected to frame members 166, 168. The assembly of the tubes 162, 164 and the frame members 166, 168 is shorted than the portions 158, 160 of the fixed tubes 148, 150. The aisle seat frame portion includes tubes 170, 172, a portion of which spans between frame members 174, 176. Frame member 174 is the support frame for the aisle armrest 66. Tubes 170, 172 include portions 178, 180 which project from frame member 176 towards the window. These portions 178, 180 extend into the portions 158, 160 of fixed tubes 148, 150. Tubes 148, 150 are fixed in position. The assembly composed of tubes 162, 164 and frame members 166, 168 is movable sideways back and forth on the tube portions 158, 160, a distance X. In the example, this distance is approximately three inches. The assembly of tubes 170, 172 and frame members 174, 176 is movable sideways relative to frame member 140 a distance c or, in the example, six inches. Frame member 176 is offset, as illustrated, to permit this movement. Tubes 178, 180 move telescopically within the tubes 158, 160 during movement of the frame for aisle seat LA.

Aisle seat LA includes a seat back frame 182 which is pivotally connected at its lower end to portions of frame members 174, 178. In similar fashion, window seat LW includes a seat back frame 184 which is pivotally connected at its lower end to frame members 186, 152. Frame member 186 is fixed in position relative to frame member 142. The seat back frame for the middle seat LM is split into two parts 188, 190. Seat cushion part A is supported by frame part 188. Seat cushion part W is supported by frame portion 198. The seat cushions are not shown in FIG. 10, but the locations of the seat cushion parts A, W is indicated by use of the reference characters A, W. The lower ends of the frame parts 188, 190 are pivotally mounted relative to each other and relative to the frame members 166, 168. Frame part 188 is pivotally mounted on an upwardly extending rear portion of frame member 166. Frame member 190 is pivotally mounted on an upwardly extending rear portion 194 of frame member 168. A rod 196 extends between lower tubular portions 198, 200 of the frame members 188, 190, so as to interconnect the lower portions of frame parts 188, 190 in a manner allowing each to independently pivot forward and backwards.

When the seats are configured to provide three seats LA, LM, LW, spaced apart a distance S1, the assembly of members 162, 164, 166, 168 is positioned as shown in FIG. 10. Also, the assembly 170, 172, 174, 176 is positioned as shown in FIG. 10. Also, the two frame parts c188, 190 are locked together so that together they form a support frame for a middle seat LM. When it is desired to convert from three seats to two seats with a wider spacing, the seat back frame parts 188, 190 are disconnected from each other. The assembly 162, 164, 166, 168 is moved sideways towards the window seat. This places seat back frame portion 190 against seat back frame 184. These two frames 190, 184 are then connected together to constitute a larger seat back frame for the newly defined window seat LW. The assembly 170, 172, 174, 176 is also telescopically moved towards the window until seat back frame 182 is next to seat back frame 188. Then, these seat back frames 182, 188 are connected together so as to define a seat back frame for the newly defined aisle seat LA.

Frame member c186 carries an armrest mount 202 at its upper end which includes a side rod 204. In similar fashion, frame member 166 has an upwardly extending rear portion 206 which carries at its upper end an armrest mount 208. Armrest mount 208 includes a slide rod 210. Armrest 70 is mounted on mount 208, to slide sideways on slide rod 210. In similar fashion, armrest 72 is mounted on mount 202, to slide sideways on slide rod 204. Mount 208 is sandwiched between cushions 54 and 56. Mount 202 is sandwiched between cushions 56 and 58. When the seat assembly is in its three seat configuration, armrest 36 is positioned at the aisle end of mount 208 and armrest 72 is positioned at the window end of mount 202. Each armrest 70, 72 is locked in position relative to its mount 202, 204. When the seat assembly is in its two seat configuration, armrest 70 is moved toward the window end of mount 208 and armrest 72 is moved towards the aisle end of mount 202. The armrest 70, 72 are then locked into these new positions.

The constructional details which are illustrated and have been described constitute a presently preferred construction and the best mode of the invention presently known to the inventors. However, such construction is presented for purposes of illustrating the invention and not for purposes of limitation. The invention is defined by the appended claims which are to be interpreted in accordance with established rules of patent claim interpretation, including use of the doctrine of equivalents.

What is claimed is:

1. An aircraft passenger seat assembly of side-by-side window, middle and aisle seats, convertible between a first seat spacing and a second wider seat spacing, comprising:

a support base;

a seat cushion support frame on said support base, including a fixed window seat frame portion, a movable middle seat frame portion, and a movable aisle seat frame portion;

three side-by-side seat cushions, one for each of the window, middle and aisle seats, and each including a back portion and a seat portion, each said seat cushion being supported on and by its frame portion; and said middle seat frame portion and said aisle seat frame portion being movable towards and away from the window seat frame portion, and said aisle seat frame portion being movable towards and away from the middle seat frame portion, whereby, the middle seat can be moved against the window seat and the aisle seat can be moved against the middle seat, to provide the first spacing of the three seats, and the middle and aisle seats can be moved away from the window seat, and the aisle seat can be moved away from the middle seat, to provide the second wider spacing of the three seats.

2. An aircraft passenger seat assembly according to claim 1, wherein said fixed window seat frame portion is secured to the support base.

3. An aircraft passenger seat assembly according to claim 2, wherein said seat cushion support frame includes a fixed portion below the middle seat which is secured to the support base, and the movable middle seat frame portion is mounted on and by said fixed portion.

4. An aircraft passenger seat assembly according to claim 3, wherein said fixed portion below the middle seat comprises at least one tubular member and wherein the movable aisle seat frame portion includes a member which makes telescopic engagement with said tubular member, for telescopic retraction when the aisle seat frame portion is being moved toward the middle seat frame portion, and telescopic extension when the aisle seat frame portion is being moved away from the middle seat frame portion.

5. An aircraft passenger seat assembly according to claim 1, wherein said seat cushion support frame comprises a pair of parallel tubular members which are connected to the support base and which extend under both the window seat and the middle seat, with the portions of the tubular member, which extend under the window seat constituting a part of the fixed window seat frame portion, wherein the movable middle seat frame portion comprises a pair of tubular members which surround and are movable on the portions of said fixed tubular members which are below the middle seat, and wherein the movable aisle seat frame portion includes a pair of tubes having portions which are under the aisle seat and include projecting portions which telescopically enter into the portions of the fixed tubular members which are below the middle seat.

6. An aircraft passenger seat assembly according to claim 1, comprising an armrest support frame which is connected to the movable middle seat frame portion, and is movable with it towards and away from the window seat, and an armrest support frame connected to the aisle seat frame portion, and movable with it towards and away from the middle seat.

7. An aircraft passenger seat assembly according to claim 6, wherein each of said armrest support frames includes means mounting an armrest on it for sideways translation between two positions.

8. An aircraft passenger seat assembly convertible between three side]by-side seats of a first seat spacing and two side-by-side seats of a second wider seat spacing, comprising:
a support base;
a seat cushion support frame on said support base, including a fixed window seat frame portion, a movable middle seat frame portion and a movable aisle seat frame portion;
three side-by-side seat cushions, one for each of the seat frame portions, and each supported on and by its seat frame portion, each said seat cushion having a back portion and a seat portion;
said middle seat frame portion and the aisle seat frame portion being movable towards and away from the window seat frame portion, and said aisle seat frame portion being movable towards and away from the middle seat frame portion,
whereby, the middle seat frame portion, and its seat cushion, can be moved away from the window seat frame portion and its seat cushion, and the aisle seat frame portion and its cushion can be moved away from the middle seat frame portion and its seat cushion, to provide window, middle and aisle seats having the first seat spacing, and said middle seat frame portion and its seat cushion can be moved towards the window seat frame portion and its seat cushion, and the aisle seat frame portion and its seat cushion can be moved towards the middle seat frame portion and its seat cushion, to define on the three seat cushions two passenger seats having the second wider spacing.

9. An aircraft passenger seat assembly according to claim 8, wherein said fixed window seat frame portion is secured to the support base.

10. An aircraft passenger seat assembly according to claim 9, wherein said seat cushion support frame includes a fixed portion below the middle seat which is secured to the support base, and the movable middle seat frame portion is mounted on and by said fixed portion.

11. An aircraft passenger seat assembly according to claim 10, wherein said fixed portion below the middle seat comprises at least one tubular member and wherein the movable aisle seat frame portion includes a member which makes telescopic engagement with said tubular member, for telescopic retraction when the; aisle seat frame portion is being moved toward the middle seat frame portion, and telescopic extension when the aisle seat frame portion is being moved away from the middle seat frame portion.

12. An aircraft passenger seat assembly according to claim 8, wherein said seat cushion support frame comprises a pair of parallel tubular members which are connected to the support base and which extend under both the window seat and the middle seat, with the portions of the tubular member, which extend under the window seat constituting a part of the fixed window seat frame portion, wherein the movable middle seat frame portion comprises a pair of tubular members which surround and are movable on the portions of said fixed tubular members which are below the middle seat, and wherein the movable aisle seat frame portion includes a pair of tubes having portions which are under the aisle seat and include projecting portions which telescopically enter into the portions of the fixed tubular members which are below the middle seat.

13. An airccraft passenger seat assembly according to claim 8, comprising an armrest support frame which is connected to the fixed window seat frame portion, and an armrest support frame which is connected to the movable middle seat frame portion, and movable with it towards and away from the aisle seat.

14. An airccraft passenger seat assembly according to claim 13, wherein each of said arm-rest support frames includes means mounting an armrest on it for sideways translation between two positions.

15. A right side passenger seat assembly and a left side passenger seat assembly convertible between six seats in a row which includes an aisle and a first seat spacing and five seats in a row which includes an aisle and a wider second seat spacing, wherein:

a first said passenger seat assembly comprises side-by-side window, middle and aisle seats, convertible between a first seat spacing and a second wider seat spacing, comprising:

a support base;

a seat cushion support frame on said support base, including a fixed window seat frame portion, a movable middle seat frame portion, and a movable aisle seat frame portion;

three side-by-side seat cushions, one for each of the window, middle and aisle seats, and each including a back portion and a seat portion, each said seat cushion being supported on and by its frame portion; and said middle seat frame portion being movable towards and away from the window seat frame portion, and said aisle seat frame portion being movable towards and away from the middle seat frame portion, whereby, the middle seat can be moved against the window seat and the aisle seat can be moved against the middle seat, to provide the first spacing of the three seats, and the middle and aisle seats can be moved away from the window seat, and the aisle seat can be moved away from the middle seat, to provide the second wider spacing of the three seats; and said second passenger seat assembly is convertible between three side-by-side seats of said first seat spacing and two side-by-side seats of said second wider seat spacing, and comprising:

a support base;

a seat cushion support frame on said support base, including a fixed window seat frame portion, a movable middle seat frame portion and a movable aisle seat frame portion;

three side-by-side seat cushions, one for each of the seat frame portions, and each supported on and by its seat frame portion, each said seat cushion having a back portion and a seat portion;

said middle seat frame portion being movable towards and away from the window seat frame portion, and said aisle seat frame portion being movable towards and away from the middle seat frame portion, whereby, the middle seat frame portion, and its seat cushion, can be moved away from the window seat frame portion and its seat cushion, and the aisle seat frame portion and its cushion can be moved away from the middle seat frame portion and its seat cushion, to provide window, middle and isle seats having the first seat spacing, and said middle seat frame portion and its seat cushion can be moved towards the window seat frame portion and its seat cushion, and the aisle seat frame portion and its seat cushion can be moved towards the middle seat frame portion and its seat cushion, to define on the three seat cushions two passenger seats having the second wider spacing.

16. The combination of an aircraft passenger seat assembly according to claim 15, wherein in each window seat assembly said fixed window seat frame portion is secured to the support base.

17. The combination of an aircraft passenger seat assembly according to claim 16, wherein in each passenger seat assembly said seat cushion support frame includes a fixed portion below the middle seat which is secured to the support base, and the movable middle seat frame portion is mounted on and by said fixed portion.

18. The combination of an airccraft passenger seat assembly according to claim 17, wherein in each passenger seat assembly the said fixed portion below the middle seat comprises at least one tubular member and wherein the movable aisle seat frame portion includes a member which makes telescopic engagement with said tubular member, for telescopic retraction when the aisle seat frame portion is being moved towards the middle seat frame portion, and telescopic extension when the aisle seat frame portion is being moved away from the middle seat frame portion.

19. The combination of an airccraft passenger seat assembly according to claim 15, wherein in each passenger seat assembly said seat cushion support frame comprises a pair of parallel tubular members which are connected to the support base and which extend under both the window seat and the middle seat, with the portions of the tubular members which extend under the window seat constituting a part of the fixed window seat frame portion, wherein the movable middle seat frame portion comprises a pair of tubular members which surround and are movable on the portions of said fixed tubular members which are below the middle seat, and wherein the movable aisle seat frame portion includes a pair of tubes having portions which are under the aisle seat and projecting portions which telescopically enter into the portions of the fixed tubular members which are below the middle seat.

20. The combination of an airccraft passenger seat assembly according to claim 15, wherein in each passenger seat assembly there is an armrest support frame which is connected to the movable middle seat frame portion, and is movable with it.

21. The combination of an aircraft passenger seat assembly according to claim 20, wherein said armrest support frame includes means mounting an armrest on it for sideways translation between two positions.

22. The combination of claim 20, wherein said first passenger seat assembly comprises an armrest frame connected to the movable aisle seat frame, and said armrest support frame includes means mounting an armrest on it for sideways translation between two positions.

23. The combination of claim 20, wherein the second passenger seat assembly comprises an armrest support frame connected to the fixed window seat frame, adjacent the middle seat, and said armrest support frame includes means mounting an armrest on it for sideways translation between two positions.

* * * * *

UNITED STATES PATENT AND TRADEMARK OFFICE
CERTIFICATE OF CORRECTION

PATENT NO. : 5,104,065
DATED : April 14, 1992
INVENTOR(S) : Donald R. Daharsh, Wallace A. Peltola and James B. Sterling It is certified that error appears in the above-identified patent and that said Letters Patent is hereby corrected as shown below:

Col. 3, line 44, delete "are moved" and insert -- removed --.
Col. 3, lines 59 and 60, there should be a hyphen between "extendible" and "contractible".
Col. 5, line 8, "seats A" should be -- seats LA --.
Col. 5, line 54, "sea" should be -- seat --.
Col. 5, line 58, "spaded" should be -- spaced --; and "74c, 76c" should be -- 74, 76 --.
Col. 6, line 19, "74c" should be -- 74 --.
Col. 6, line 56, "c134" should be -- 134 --.
Col. 6, line 63, "looking" should be -- locking --.
Col. 7, line 4, "c138" should be -- 138 --.
Col. 7, line 25, "shorted" should be -- shorter --.
Col. 7, line 39, "distance c" should be -- distance 2X --.
Col. 8, line 4, "c188" should be -- 188 --.
Col. 8, line 19, "c186" should be -- 186 --.
Claim 8, col. 9, line 57, "side]by-side" should be -- side-by-side --.

UNITED STATES PATENT AND TRADEMARK OFFICE
CERTIFICATE OF CORRECTION

PATENT NO. : 5,104,065
DATED : April 14, 1992
INVENTOR(S) : Donald R. Daharsh, Wallace A. Peltola and James B. Sterling It is certified that error appears in the above-identified patent and that said Letters Patent is hereby corrected as shown below:

Claim 11, column 10, line 35, delete the semicolon after "the".
Claim 13, col. 10, line 56, "airccraft" should be -- aircraft --.
Claim 14, col. 10, line 62, "airccraft" should be -- aircraft --;
    and in line 63, "arm-rest" should be -- armrest --.
Claim 18, col. 12, line 12, "airccraft" should be -- aircraft --.
Claim 19, col. 12, line 23, "airccraft" should be -- aircraft --.
Claim 20, col. 12, line 40, "airccraft" should be -- aircraft --.

Signed and Sealed this

Thirty-first Day of August, 1993

Attest:

BRUCE LEHMAN

Attesting Officer

Commissioner of Patents and Trademarks